US007398484B2

(12) United States Patent
Ruf

(10) Patent No.: US 7,398,484 B2
(45) Date of Patent: Jul. 8, 2008

(54) MEMORY EFFICIENT ARRAY TRANSPOSITION VIA MULTI PASS TILING

(75) Inventor: Erik S. Ruf, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 80 days.

(21) Appl. No.: 11/116,628

(22) Filed: Apr. 27, 2005

(65) Prior Publication Data

US 2006/0248489 A1 Nov. 2, 2006

(51) Int. Cl.
*G06F 17/50* (2006.01)
*G06F 12/00* (2006.01)
*G06F 13/00* (2006.01)
*G06F 13/28* (2006.01)

(52) U.S. Cl. .............................. 716/2; 716/3; 711/101; 711/165

(58) Field of Classification Search ................ 716/2–3, 716/10; 711/101, 165
See application file for complete search history.

(56) References Cited

U.S. PATENT DOCUMENTS

| 6,438,747 | B1* | 8/2002 | Schreiber et al. ............ 717/160 |
| 6,507,947 | B1* | 1/2003 | Schreiber et al. ............ 717/160 |
| 2005/0102572 | A1* | 5/2005 | Oberlaender ................. 714/29 |
| 2006/0026154 | A1* | 2/2006 | Altinel et al. ................. 707/5 |
| 2006/0031652 | A1* | 2/2006 | Richter et al. ............... 711/165 |
| 2006/0069874 | A1* | 3/2006 | Desai ........................ 711/128 |
| 2006/0143390 | A1* | 6/2006 | Kottapalli .................... 711/130 |
| 2006/0224834 | A1* | 10/2006 | O'Connor et al. ........... 711/143 |

OTHER PUBLICATIONS

Wolfe "*High Performance Compilers for Parallel Computing,*" pp. 137-165, 307-366, 367-384 and 514-527, Addison-Wesley, Redwood City, CA, 1996.

Aggarwal and Vitter, "The input/output complexity of sorting and related problems," *Communications of the ACM* 31(9):1116-1127, Sep. 1998.

Chatterjee et al., "Recursive array layouts and fast parallel matrix multiplication," In *ACM Symposium on Parallel Algorithms and Architectures*, pp. 222-231, 1999.

(Continued)

*Primary Examiner*—Jack Chiang
*Assistant Examiner*—Suresh Memula
(74) *Attorney, Agent, or Firm*—Klarquist Sparkman LLP

(57) ABSTRACT

A schedule can be generated for physically transposing an array such that when the array is transferred from a first memory type to a second memory type, the number of block transfers performed is minimized. The array can be rearranged to ensure that most or all data elements in any block read into internal memory are used before that block's internal storage is reused. The algorithm can compute an offline schedule and then execute that schedule. The method can assemble the schedule during one or more passes with an algorithm. Scheduling passes can apply a permutation to a representation of the array's structure and then tile the representation to ensure efficient use of internal memory. Tiling may alter the permutation, so the algorithm can be reinvoked and run on the tiled representation. The algorithm can be run on successively retiled representations until no additional tiling is required. Optimizations for schedule generation and/or execution include: simplification of the data structure representing the array; alteration of the order in which tiles are accessed; inversion of permutations; processing non-canonical input; and the production of stream output. The method can also be modified for specialized architectures, including: block I/O architecture; fully associative caches; set-associative caches; and multi-level memory hierarchies.

15 Claims, 9 Drawing Sheets

OTHER PUBLICATIONS

Cormen "*Virtual Memory for Data-Parallel Computing,*" PhD Thesis, Massachusetts Institute of Technology, 1992, mIT/LCS/TR-559.

Cormen "Fast permuting on disk arrays," *Journal of Parallel and Distributed Computing* 17(1-2):41-57, 1993.

Chatterjee and Sen, "Cache-efficient matrix transposition." In *HPCA*, pp. 195-205, 2000.

Frigo et al., "Cache-oblivious algorithms," In *Proceedings of the 40th Annual Symposium on Foundations of Computer Science*, p. 285, 1999.

Fraser "Array permutation by index-digit permutation," *Journal of the ACM*, 23(2):298-309, 1976.

Jouppi "Cache write policies and performance," Technical Report 91/12, DEC WRL, 1991.

Kaushik et al., "Efficient transposition algorithms for large matrices." In *Proceedings of the 1993 ACM/IEEE Conference on Supercomputing*, pp. 656-665, 1993.

Lin et al. "Efficient representation scheme for multidimensional array operations," *IEEE Transactions on Computers*, 51(3):327-345, 2001.

Lam et al., "The cache performand and optimization of blocked algorithms," In *Proceedings of the Fourth International Conference on Architectural Support for Programming Languages and Operating Systems*, pp. 63-74, 1991.

Muchnick "*Advanced Complier Design and Implementation,*" Morgan Kaufmann, San Francisco, 1997.

Sen et al. "Towards a theory of cache-efficient algorithms," *Journal of the ACM*, 9(6):828-858, 2002.

Swarztrauber "Transposing large arrays in extended memory," pp. 283-288, 1988.

Wolf and Lam, "A data locality optimizing algorithm," In *Proceedings of the SIGPLAN '91 Conference on Programming Language Design and Implementation*, pp. 30-44, 1991.

Cormen et al., "Asymptotically tight bounds for performing BMMC permutations on parallel disk systems," *SIAM Journal on Computing*, 28(1):105-136, 1998.

\* cited by examiner

Fig. 3

```
gen_passes(s, p, b, m)
        schedule := empty  // N.B. schedule is a list of ispaces
        while (true)
                i := make_canonical_layout_ispace(s)
                i' := simplify(permute(i, p))
                if (has_canonical_layout(i'))
                        return schedule
                <i",p'> := gen_pass(i',b, m)
                schedule := append(schedule, simplify(i"))
                s := i".shape
                p := p'
```

Fig. 5

```
gen_pass(i, b, m)
        itiles=empty; ifactors=empty
        availBlocks = m / b
        for j=length(i)-1 to 0 step -1
                count = i[j].count
                stride = i[j].stride
                if ((j==length(i)-1 && stride==1) || count==1)
                        itiles = append(itiles, i[j])
                        ifactors = append(ifactors, 1)
                else
                        desiredBlocks = ceiling(count * min(stride, b) / b)
                        tileBlocks = min(availBlocks, desiredBlocks)
                        availBlocks = availBlocks / tileBlocks
                        if (stride > b)
                                tileCount = tileBlocks
                        else
                                tileCount = min(count, tileBlocks * b / stride)
                        factorCount = count / tileCount
                        factorStride = tileCount * stride
                        itiles = append(itiles, <tileCount, stride>)
                        ifactors = append(ifactors, <factorCount, factorStride>)
        i' = append(ifactors, itiles)
        p' = empty
        for j=0 to (i.Rank-1) step 1
                p' = append(p', j)
                p' = append(p', j+length(i))
        return <i',p'>
```

Fig. 7

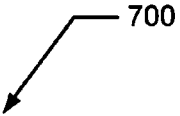

```
execute(ps, a)
        foreach ispace i in ps
                a' = <allocate target array of size a.size>
                for j=0 to a.size-1 step m
                        for k=j to min(j+m-1, a.size-1) step 1
                                a'[k] = a[i.Enumerate(k)]
                a = a'
        return a
```

Fig. 8

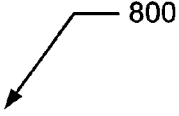

```
gen_passes(s, p, b, m)
        schedule := empty   // N.B. schedules is a list of pairs of ispaces
        while (true)
                i := make_canonical_layout_ispace(s)
                i' := simplify(permute(i, p))
                if (has_canonical_layout(i'))
                        return schedule
                <i'', p'> := gen_pass(i', b, m/2)
                i''' := simplify(permute(i'', p'))
                <i'''', p''> := gen_pass(i''', b, m/2)
                schedule := append(schedule, <simplify(i''), simplify(i'''')>)
                s := i'''.shape
                p := p''
```

```
execute(ps, a)
foreach pair of ispaces <iRead, iWrite> in ps
        a' = <allocate target array of size a.size>
        for j=0 to a.size-1 step m/2
                for k=j to min(j+m/2-1, a.size-1) step 1
                        a'[iWrite.Enumerate(k)] = a[iRead.Enumerate(k)]
        a = a'
return a
```

Fig. 10

```
gen_pass(i, b, m, k)                // k>=2
    itiles=empty; ifactors=empty
    availBlocks = m / b
    availAssoc = k;
    for j=length(i)-1 to 0 step -1
        count = i[j].count
        stride = i[j].stride
        if ((j==length(i)-1 && stride==1) || count==1)
            itiles = append(itiles, i[j])
            ifactors = append(ifactors, 1)
        else
            if (stride > m/k)
                assocLimit = availAssoc
            else
                assocLimit = m/s * availAssoc/k
            assocCount = min(count, assocLimit);
            desiredBlocks = ceiling(assocCount * min(stride, b) / b)
            tileBlocks = min(availBlocks, desiredBlocks)
            availBlocks = availBlocks / tileBlocks
            if (stride > b)
                tileCount = tileBlocks
            else
                tileCount = min(assocCount, tileBlocks * b / stride)
            if (stride > m/k)
                availAssoc = availAssoc / tileBlocks
            else
                availAssoc = min(availAssoc, (m / (tileCount * stride)))
            factorCount = count / tileCount
            factorStride = tileCount * stride
            itiles = append(itiles, <tileCount, stride>)
            ifactors = append(ifactors, <factorCount, factorStride>)
    i' = append(ifactors, itiles)
    p' = empty
    for j=0 to (i.Rank-1) step 1
        p' = append(p', j)
        p' = append(p', j+length(i))
    return <i',p'>
```

```
enumerate(i)
        c = ispace_counts(i)
        d = ispace_strides(i)
        n = ispace_size(i)
        counts = <new vector of length i.rank, initialized to 0's>
        while (n > 0)
                emit dot_product(counts, d)
                index = i.rank – 1
                carry = 1
                while (index >= 0)
                        inc_count = carry + counts[index]
                        carry = if (inc_count > c[index]) 1 else 0
                        counts[index] = if (carry == 1) 0 else inc_count
                        index = index – 1
                n = n – 1
```

MEMORY EFFICIENT ARRAY TRANSPOSITION VIA MULTI PASS TILING

TECHNICAL FIELD

The present application relates to generating a schedule for transposing a computer memory array.

BACKGROUND

Computer systems often use a storage hierarchy consisting of several types of memory—cache, RAM, and disk storage, for example. Ideally, memory accesses incur the same unit cost, regardless of the memory location being accessed. In such a system, operations that reorder the elements of an array (e.g., permutation of axes), can be performed by manipulating address computations, leaving the array's memory layout unaltered. No additional memory costs are incurred.

In reality, storage hierarchies tend to have non-uniform access costs. Usually, a small, fast, internal memory that allows uniform, element-wise access is paired with a large, slow, external memory that requires (or performs best with) multi-element block accesses. For example, a microprocessor cache may be paired with RAM. Such a hierarchical memory architecture induces a dependence between array layout and traversal order: axes whose strides are smaller than the optimal block size can be traversed more efficiently (i.e., with fewer block reads) than those with larger strides. Thus a memory layout that is optimal for one permutation of an array's axes may be highly inefficient for another. FIG. 1A shows a 4×4 array 100, containing elements $a_0$-$a_{15}$, stored in row-major order in an external memory having a block size of four elements (thus each row 110(a-d) requires a single block read). Although this is a 2-dimensional array, the problem also arises with arrays of larger dimensions. As shown in FIG. 1B, traversing a row of the array (e.g., elements $a_0$, $a_1$, $a_2$ and $a_3$, shown in bold type) requires only a single block read. However, as shown in FIG. 1C, traversing a column (e.g., elements $a_0$, $a_4$, $a_8$ and $a_{12}$, shown in bold type) requires four block reads. Thus, a row-major traversal of the entire array requires 4 block reads, while a column-major traversal will require between 4 and 16 block reads, depending on the size of the internal memory. If the internal memory holds fewer than four blocks at a time, a column-major traversal of the array will have to load some blocks multiple times, potentially causing delays in processor execution and generating unnecessary memory traffic.

In some cases, the inefficiency resulting from this situation can be so large that the cost of physically rearranging the array to permit more efficient access is less than the cost of block reads saved in subsequent traversals of the rearranged array. In such cases, it is important to perform the physical rearrangement efficiently (i.e., with the minimal number of block transfer operations). Donald Fraser, "Array Permutation by Index-Digit Permutation," *Journal of the ACM*, vol. 23, no. 2, April 1976, pp. 298-309, teaches that an array may be reordered according to permutation of the digits forming its indices. Fraser describes efficient implementations of some specialized bit permutations, but does not explain how to generate a schedule for general array transposition. Thomas H. Cormen, "Fast Permuting on Disk Arrays," Journal of Parallel and Distributed Computing, vol. 17, 1993, pp. 41-57, teaches a method of generating a schedule for a set of bit operations that includes transposition, but the method is relatively complex.

SUMMARY

A described method physically transposes an array in a manner ensuring that the number of block transfers performed during the rearrangement is minimized. It accomplishes this by ensuring that all data elements in any block read into internal memory are used (i.e. written to a block in external memory) before that block's internal storage is reused. This memory efficiency constraint limits the amount of rearrangement that can be performed in a single read/write pass; thus, multiple passes may be required. The algorithm computes an offline schedule describing the memory accesses to be performed in each pass and then accomplishes the rearrangement by executing the operations described in the schedule.

The schedule generation algorithm operates by repetitively transforming a representation of the array's physical structure until the desired structure is achieved. Each invocation of the schedule generation algorithm first applies the input permutation to the representation and then performs a "tiling" transformation that groups memory accesses into regions ("tiles") that ensure efficient use of internal memory. The transformed ("tiled") representation is then added to the schedule. The tiling transformation may introduce an additional, undesired permutation, in which case the algorithm is reinvoked on the tiled representation and the inverse of the undesired permutation. Once the "multipass" schedule is constructed, it can be executed on the array itself.

Optimizations are available to speed up schedule generation and/or execution, including: simplification of the data structure representing the array; alteration of the order in which tiles are accessed; inversion of permutations; processing non-canonical input; and the production of stream output. The method can also be modified for specialized architectures, including: block I/O architecture; fully associative caches; set-associative caches; and multi-level memory hierarchies.

The foregoing and other objects, features, and advantages will become more apparent from the following detailed description, which proceeds with reference to the accompanying figures.

BRIEF DESCRIPTION OF THE DRAWINGS

FIG. 3 is a sample pseudocode listing of the main loop described in FIG. 2.

FIG. 5 is a sample pseudocode listing of the tiling algorithm described in FIG. 4.

FIG. 7 is a sample pseudocode listing of the schedule execution method described in FIG. 6.

FIG. 8 is a sample pseudocode listing of the main loop described in FIG. 2, with modifications for a fully-associative write-back cache.

FIG. 10 is a sample pseudocode listing of the tiling algorithm described in FIG. 4, with modifications for a power-of-2 set-associative cache architecture.

DETAILED DESCRIPTION

Figure 1:
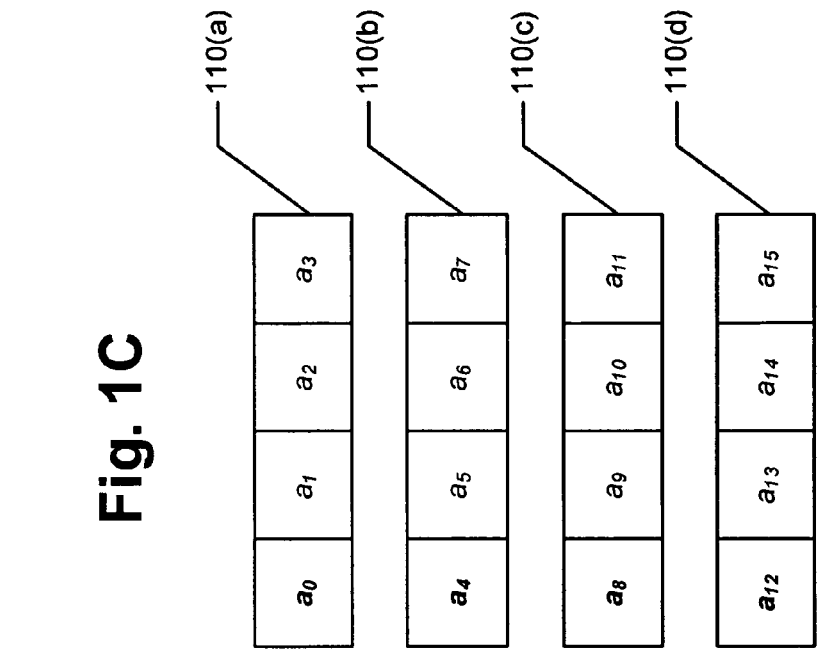
FIG. 1A depicts a 4×4 memory array featuring row and column axes.
FIG. 1B depicts a row-major traversal of the array of FIG. 1A.
FIG. 1C depicts a column-major traversal of the array of FIG. 1A.

The multidimensional array transposition operator takes an input array a and a permutation vector p and returns a transposed array a' such that $a'[i_0, \ldots, i_{n-1}] = a[p[i_0], \ldots, p[i_{n-1}]]$. In conjunction with a "reshape" operation, the transposition operator enables a variety of explicit data restructuring transformations, including bit reversal, blocking/unblocking, strided access, and record grouping and ungrouping. Transposition is also an implicit component of many primitive operations, including general inner/outer product and axis-specific transformations such as reduction and prefix scan.

Every multidimensional array a has an integral shape vector s, each of whose elements describes the count of the corresponding dimension. For example, a 2 by 4 matrix would be described by $s=\{2, 4\}$. The length r of s denotes the dimensionality (or rank) of a, while the elementwise product of s ($s_0 \cdot \ldots \cdot s_{r-1}=n$) denotes the size of a. A canonical traversal (often called a "ravel-order traversal") of a returns a sequence of elements obtained by indexing a with a sequence of index vectors i, where $i_0=\{0, \ldots, 0\}$ and $i_{n-1}=\{s_0-1, s_1-1, \ldots, s_{r-1}-1\}$, such that the rightmost ((r-1)st) dimension varies most rapidly.

One embodiment assumes a two-level memory hierarchy with an external memory of arbitrary size and an internal memory of size m elements. For example, the external memory may be RAM, while the internal memory may be a cache. Transfers between the two memories are restricted to blocks of size b elements aligned on block boundaries. Transfers may be explicit or implicit depending on the particular transfer architecture in use. (Details specific to particular transfer architectures are addressed below.)

The physical layout of a dense, multidimensional array is described by a base address x, an element size e (an integral power of 2, denoting a byte count) and a stride vector d. The address of the element indexed by the index vector $j=\{j_0, \ldots, j_{r-1}\}$ is obtained by computing $x+ej \cdot d$. If a canonical traversal of the array reads elements at stride e, the array has canonical layout. (This is equivalent to standard dense row-major layout.) For simplification, it can be assumed that x=0 and e=1. These assumptions cause no loss of generality, provided that the array is suitably aligned, and provided that memory parameters are expressed in terms of elements, rather than bytes.

The objective of the method can be expressed as follows: Given a canonical-layout external memory array a of size n with shape vector s, and a vector p denoting a permutation of s, produce a canonical-layout external memory array a'=transpose(a,b), while minimizing the number of block accesses to the external memory.

The primary data structure used by the scheduling and execution algorithms to represent an array structure is the iteration space, or ispace. The ispace encodes the memory offsets accessed in a canonical order traversal of the array it represents. A rank-r ispace is an r-tuple of pairs $<c_i, d_i>$ where $c_i$ and $d_i$ are the count and stride values, respectively, for the ith dimension of the described array. This pairing of count and stride values is convenient for permutation, simplification, factoring, and the checking of various properties such as canonical-order layout. It need not be implemented as a tuple of pairs (e.g., a pair containing the shape and stride vectors would also suffice).

The present embodiment provides two ways to simplify an ispace. First, any degenerate dimension (i.e., $s_j=1$) can be removed. Second, adjacent dimensions $s_j$ and $s_{j+1}$ can be combined if $d_j = s_{j+1} * d_{j+1}$.

Figure 11:
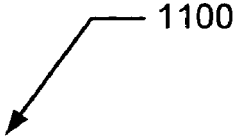
FIG. 11 is a sample pseudocode listing of an ispace enumeration method.

The process of "enumerating" an ispace returns a sequence of integral offset values describing a canonical traversal of the array, obtained by the following process: Given an ispace x of rank r and size n, construct shape and size vectors c and d by projecting from x the count values $c_i$ and stride values $d_i$, respectively, where ($0 \leq i < r$). Generate a sequence of n index vectors j, where $j_0=\{0, \ldots, 0\}$ and $j_{n-1}=\{c_0-1, \ldots, c_1-1, \ldots, c_{r-1}-1\}$, such that $0 \leq (j_k)_i < c_k$ and $j_k << j_{k+1}$ (where the '<<' symbol compares vectors using a lexicographic ordering based on '<'), where $0 \leq k < n$ For every index vector $j_k$, the corresponding emitted offset is computed by the vector dot product $d \cdot j_k$ Another way to describe this is to view the elements of shape vector c as digits in a multi-radix number x where the kth digit position's radix is $d_k$, and to sequentially enumerate the first n numbers beginning with zero. Pseudocode for a simple ispace enumeration method 1100 is given in FIG. 11.

In pseudocode found in the figures, the notation i.Enumerate(k) represents the kth integer returned by enumerating the iteration space i.

Figure 2:
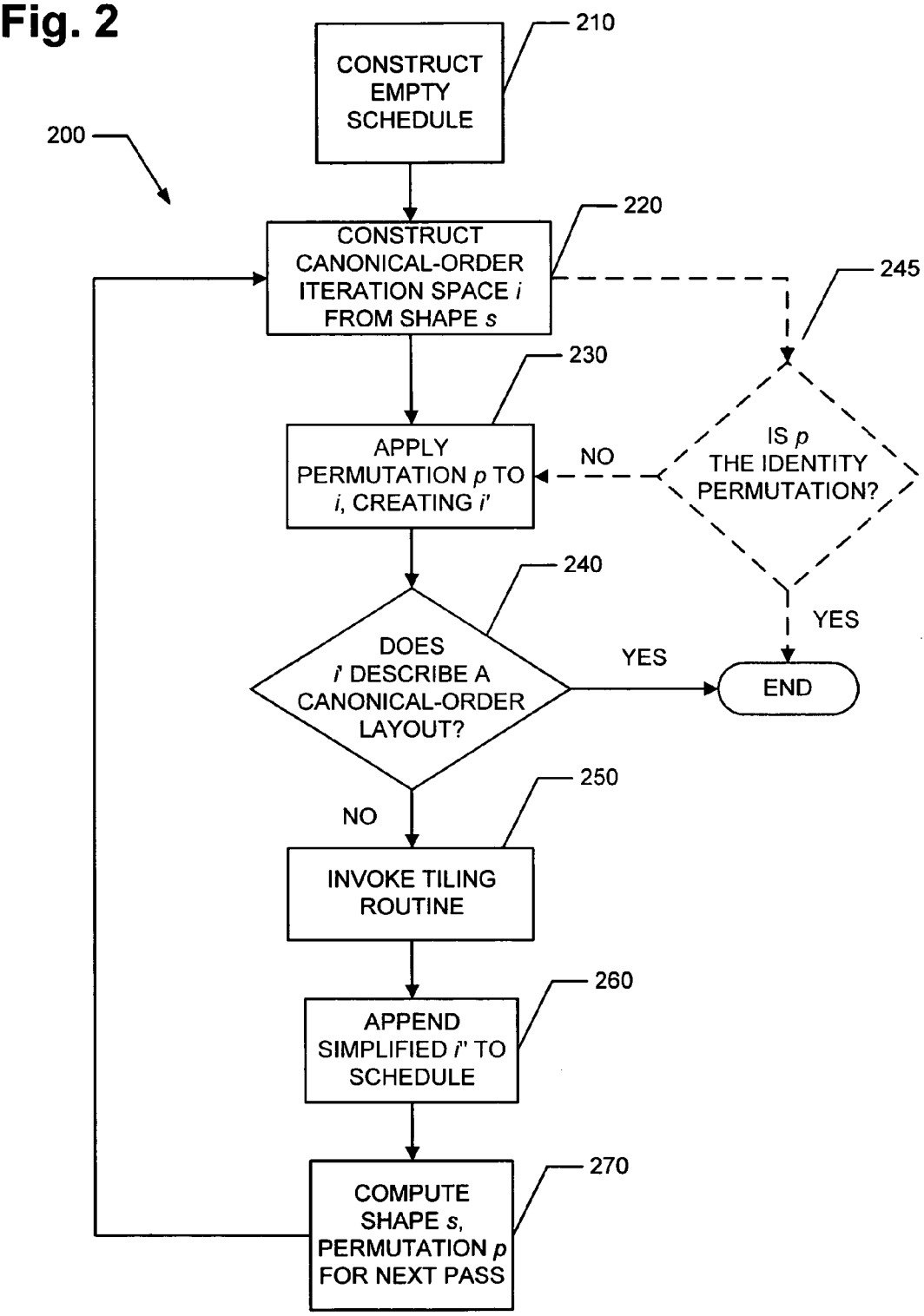
FIG. 2 is a flowchart showing steps of main loop of the multi-pass tiling algorithm.

FIG. 2 shows a flowchart of the main loop 200 (or "driver loop") of the multipass scheduling method (or "pass generation method"). In one embodiment, the main loop is passed a shape vector s, a desired permutation p, the size b of blocks in the faster memory, and the size m of the faster memory. The loop 200 constructs an empty schedule in step 210 and constructs an iteration space i in step 220. In step 230, the permutation p is applied to i, creating i'. The method examines i' to see if it describes a canonical-order layout in step 240—if it does, the loop 200 terminates. (Alternatively, instead of executing step 240, the loop 200 can execute step 245 by checking p and terminating if p is the identity permutation. However, this limits the use of alternative termination criteria.) If i' describes a non-canonical order layout, a tiling routine is invoked in step 250. The tiling routine generates a transformed ispace i" and a corresponding "fixup" permutation, and i" is emitted to the multipass schedule in step 260. The loop 200 then updates the shape s and permutation p in step 270 for use in the next pass of the loop 200.

FIG. 3 shows sample pseudocode of an implementation 300 for the main loop 200. The simplify operator carries out simplification an iteration space data structure, using the methods described above, for example.

Figure 4:
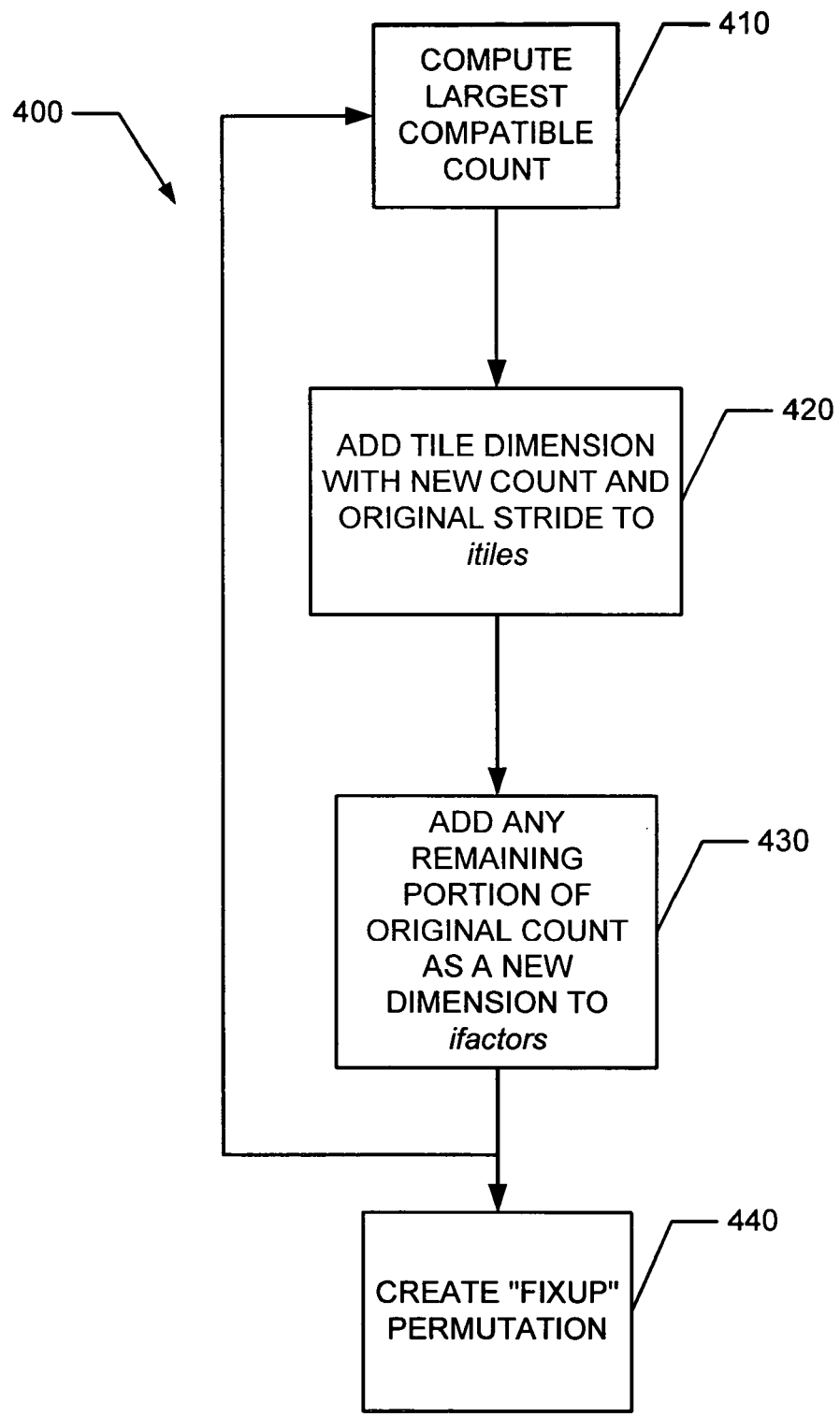
FIG. 4 is a flowchart showing steps of the tiling algorithm.

FIG. 4 shows a flowchart of the general steps of the tiling algorithm 400. This algorithm transforms an arbitrary iteration space i of rank r into a concatenation of two iteration spaces ifactors and itiles. In one embodiment, the iteration space i, the block size b and the memory size m are passed to the tiling algorithm 400. For each dimension of the ispace, beginning with the innermost dimension $i_{r-1}$, steps 410-430 are executed. Step 410 calculates the largest count compatible with the goal of memory-friendliness (i.e., filling internal memory completely, with the minimum number of block reads). Next, a tile dimension with the new count and the original stride is added to itiles in step 420. If any portion of the original count remains, it is added in step 430 as a new dimension in the ifactors space, with a stride equivalent to the memory span of the new tile dimension. Once all dimensions of the ispace have been processed, step 440 computes a "fixup" permutation that places each factor immediately outside its corresponding tile.

More specifically, the tiling algorithm processes dimension counts in a "greedy" manner, beginning with the innermost dimension (rightmost in the iteration space descriptor). The algorithm calculates a count of "available" memory blocks in the faster memory (for example, by dividing the size m of the internal memory by the block size b). This count is reduced as tile dimensions are constructed. If the dimension is of stride 1, it is completely traversed (i.e., assigned a tile count equal to the dimension count, and assigned a factor count of 1), but the available count is not reduced. This is memory-efficient because blocks are read densely, and in the case of the innermost dimension, no other dimension has yet loaded another block that might be evicted. Dimensions having count 1 (i.e. degenerate dimensions) are processed in a similar manner.

For dimensions not of count 1, the algorithm determines how much data it can afford to read given the available internal memory. The algorithm computes the number of memory blocks used by a tile from the stride and available block count, and updates the available block count. The tile count is computed from the tile block count, the input stride of the particular dimension of i, and the block size, in a manner that maximizes the count while guaranteeing that the internal memory will not be overflowed. The factor count and stride are simple functions of the tile count and stride.

In cases where factors with counts other than 1 are created, the permutation achieved by executing the tiled iteration space i will not be the same as the input permutation p. A new fixup permutation is constructed in step 440 that pairs factors with their corresponding tiles. Additionally, it is possible to avoid generating tile and factors of count 1, provided that appropriate modifications are made to the new permutation. The new permutation and the tiled iteration space are returned as inputs for the next pass of the main loop 200.

FIG. 5 shows sample pseudocode for an implementation 500 of the tiling algorithm 400.

Figure 6:
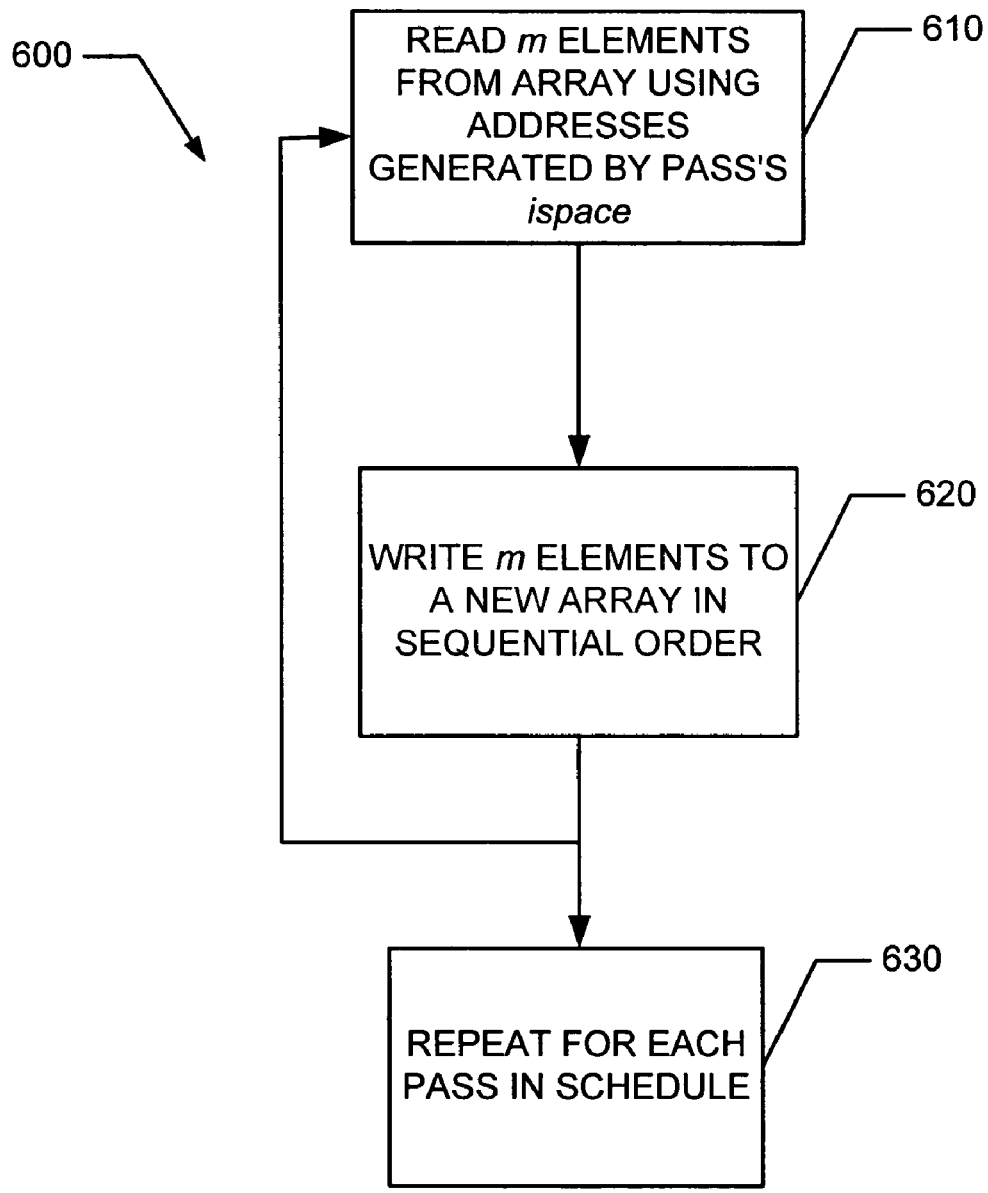
FIG. 6 is a flowchart of a schedule execution method.

Once a schedule has been constructed, it must be executed (i.e., the physical transformations it describes must be performed) to achieve the desired array transposition. FIG. 6 provides a flowchart of one possible execution method 600 of a schedule. Note that exactly how this occurs depends on the memory hierarchy of a particular system. FIG. 6 assumes a fully associative LRU cache with write-around write semantics (i.e., writes are accumulated in a serial buffer, and do not affect the cache). Alternative hierarchies are addressed below.

In step 610, for the current pass of the schedule, execution method 600 reads m elements of the array using addresses generated by the enumerating the pass's ispace. In step 620, m elements are written to a new, disjoint array in sequential order. As shown by the pseudocode of FIG. 7, the copying may be split into an outer sequential loop that fills and empties the internal memory once per iteration, and a parallelizable inner loop that does the actual copying. (If a serial traversal is desired, the inner loops can be fused.) The tiling algorithm 400 that constructs the ispaces used in execution guarantees that no more than m/b distinct cache lines are read by a single instance of the inner loop. The loop comprising steps 610 and 620 runs a.size/m times for each pass in the schedule. As shown in both FIG. 7 and in step 630 of FIG. 6, steps 610 and 620 are repeated for other passes in the schedule.

In some cases, the final pass in the schedule need not allocate and write to a destination array. As explained below, if the computation consuming the output can process a canonical-order stream, the computation can simply be fed the data element-by-element.

This section demonstrates the algorithm as it applies the permutation vector <1, 0> to the axes of a two-dimensional array of shape <4, 4> in a system with block size b=4 and internal memory size m=2. The driver loop begins by constructing a canonical-order ispace i=<<4, 4>, <4, 1>> that describes the structure of a 4×4 array stored in standard row-major format. It then applies the permutation, yielding i'=<<4, 1>, <4, 4>>. Since i' does not have canonical layout, the driver invokes the tiling algorithm to generate a transformation pass.

When the tiling algorithm begins, the internal memory has two blocks available. The algorithm first examines the inner dimension <4, 4>. The algorithm uses the count and stride values (both 4 in this case) to determine that traversing this dimension will require four blocks of internal memory (desiredBlocks in FIG. 5). Only two memory blocks are available, so only two elements can be read, resulting in a tile dimension <2, 4> indicating that only 2 blocks are to be read at the original stride (4). The remaining elements are accounted for by the creation of a factor dimension <2, 8> representing two instances of the <2, 4> tile. The number of available blocks is reduced to 1. Next, the outer dimension <4, 1> is examined. This dimension requires only one memory block, which is available, resulting in a tile dimension <4, 1> that covers the entire outer dimension, and a degenerate factor <1, 4>. The new ispace i"=<<1, 4>, <2, 8>, <4, 1>, <2, 4>> is generated by appending the new tile dimensions to the new factor dimensions. A simplified version, <<2, 8>, <4, 1>, <2, 4>>, is added to the schedule. The driver loop executes again on the shape s=<1, 2, 4, 2> and the residual permutation p=<0, 2, 1, 3>.

In the second iteration of the driver loop, the simplified permuted ispace i'=<<4, 2>, <2, 8>, <2, 1>> does not have canonical layout, causing it to be tiled. The tiling algorithm finds that the second and third dimensions can be accommodated within internal memory, yielding tile dimensions identical to the input dimensions, and factors <1, 16> and <1, 2>, respectively. The outermost dimension does not fit in internal memory, causing it to be decomposed into a factor <2, 4> and a tile <2, 2>. Thus, the new ispace i" is <<2, 4>, <1, 16>, <1, 2>, <2, 2>, <2, 8>, <2, 1>> and the new permutation p' is <0, 3, 1, 4, 2, 5>. The simplified ispace <<4, 2>, <2, 8>, <2, 1>> is added to the schedule, and the driver loop executes again with s=<2, 1, 1, 2, 2, 2> and p=p'.

The third iteration permutes and simplifies its input ispace, yielding <16, 1>, which has canonical layout, so pass generation returns the schedule <<<2, 8>, <4, 1>, <2, 4>>, <<4, 2>, <2, 8>, <2, 1>>>.

Suppose that we wish to perform the transposition on the concrete 4×4 array stored (in canonical layout) in external memory as A={0, 10, 20, . . . , 150}. A 16-element array A' is allocated. The first schedule element, <<2, 8>, <4, 1>, <2, 4>> is executed. Doing this reads addresses {0, 4, 1, 5, 2, 6, 3, 7, 8, 12, 9, 13, 10, 14, 11, 15} of A, writing the fetched values into addresses {0, . . . , 15} of A'. This is memory efficient, since the contents of the cache lines containing {0, 10, 20, 30} and {40, 50, 60, 70} are written to A' before the lines are evicted to make room for the lines containing {80, 90, 100, 110} and {120, 130, 140, 150}. At pass completion, A'={0, 40, 10, 50, 20, 60, 30, 70, 80, 120, 90, 130, 100, 140, 110, 150}. A second sixteen-element array A" (possibly sharing storage with A) is allocated, and the process is repeated on the schedule element <<4, 2>, <2, 8>, <2, 1>>, yielding A"={0, 40, 80, 120, 10, 50, 90, 130, 20, 60, 100, 140, 30, 70, 110, 150}, which is the desired result. Again, cache lines are fully utilized before they are evicted.

The array is transposed using 32 reads and 32 writes, with 8 cache misses. Performing the same transpose directly executes only 16 reads and writes, but at a cost of 16 cache misses. Which case is preferable depends on the relative costs of internal versus external accesses in the target architecture. Performing the same transpose on the shape <512, 512> with 128 cache lines of size 1024 each yields a 256-fold improvement in cache misses over the naive version, at a cost of a 2-fold increase in the number of reads and writes.

Several optimizations are available that may speed up schedule generation and/or execution. One optimization, simplification of ispaces through removal of degenerate dimensions and/or combination of adjacent dimensions, was described above. Ispace simplification reduces the rank of the iteration spaces (ispaces) that are processed, potentially speeding up the tiling algorithm and reducing the number of counters needed when an ispace is enumerated during schedule execution. The simplify operator appears in the pseudocode of the main loop 200 in FIG. 3. However, the main loop 200 may still operate without ispace simplification, provided that equivalent reductions are introduced into the test for canonical layout in step 240.

Another possible optimization is factor sorting. As shown in step 440 of FIG. 4, the tiling algorithm 400 generates a fixup permutation corresponding to the transformed ispace. This permutation is used by the next pass of the main loop 200 to correct for factoring introduced by the tiling algorithm 400. Accordingly, the "factor" dimensions can be permuted arbitrarily as long as the corresponding inverse permutation is reflected in the fixup permutation sent to the next pass of the main loop 200. The factor sorting optimization reorders the factor dimensions in decreasing order of stride and applies the inverse reordering to the factor indices in the fixup permutation. Sorting may expose pairs of factor dimensions that can be merged via the simplification rules explained above. The resultant reduction in rank reduces the number of counters required at schedule execution time. Additionally, sorting may improve the locality of accesses to the external memory. If the external memory is itself a cache, and its block size is greater than the internal memory block size b, sorting may reduce the external memory's miss rate.

Another possible optimization uses inverse permutations. As shown in FIG. 6 and in the example above, multipass schedules may be executed in a "random read, sequential write" style, in which the source array is read in using addresses generated by enumeration of a schedule element and the result array is written to in sequential order. Alternatively, schedules may be executed in a "sequential read, random write style," where the source array is read in sequentially, while the destination array is filled in using ispace-generated addresses. This optimization may be advantageous for architectures that use internal memory to buffer writes (e.g., write-back caches). Such a style can be implemented simply by inverting the initial permutation used in the main loop 200, and by reversing the assignment statement in the innermost loop of the pseudocode implementation 700 shown in FIG. 7. If the input is available as a canonical-order stream, memory reads of the first pass of the schedule execution loop 700 can be eliminated. In some cases, using an inverse permutation requires fewer passes of the schedule execution loop 700. One way to determine whether this is the case is to run the offline algorithm of loop 200 using both permutations A further possible optimization uses non-canonical input. The main loop 200 assumes that the input array has canonical layout. However, the method would work equally well if the shape vector s describing a canonical-layout array was replaced with an ispace parameter i having arbitrary layout. This may be useful in evaluating expression directed acyclic graphs (DAGs) containing multiple dependent transpositions.

Another possible optimization provides for stream output. Step 620 of the schedule execution method of FIG. 6 writes the results of passes to memory. However, if the consumer of the transposed data does not require random memory access (e.g., to restructure the array) and can instead accept a canonical-order stream of elements, the final pass can simply read the enumerated indices from the input array and pass the results directly to the consumer. One consideration for using this optimization is that, since the final pass may use some or all of the internal memory, a stream-based consumer may have insufficient internal memory available for its own storage needs. This can be handled by introducing a memory bound requirement for the final pass of the multi-pass schedule. An ispace i is considered dense with respect to a particular memory bound l<m if and only if i has a suffix s (i.e., an ispace s such that $s_n = i_{n+k}$, for some k where $0 \leq k < i.rank$) such that $s.size \geq l \geq b$ and there exists a permutation p on the elements of s such that permute(s,p) has canonical layout. If the consumer of the transpose requires k elements of internal memory, the main loop 200 can be terminated when the generated ispace i' is dense with respect to (m−k), instead of waiting for i' to have canonical layout.

The single-pass tiling algorithm 400 has time and space costs linear in the rank of the array being transposed. In the worst case (in which no ispace simplification is performed), the rank can double on a pass. With factor sorting, only dimensions whose factor and tile counts are not equal to 1 contribute to (post-simplification) rank growth. The number of such dimensions is limited by the internal memory size. In the worst case, each such dimension is of count 2, leading to a maximum rank of $\log_2(m)$. In practice, the rank stabilizes at a small multiple of the input array rank. Given fixed block and internal memory sizes, the worst-case number of passes is proportional to the logarithm of the input size. This bound can be tightened by viewing the input permutation (specifying the reordering of the array's indices) as a bit-level permutation of a binary representation of the array's address space. Thus, the number of address bits that can be permuted across block boundaries by a single pass is limited by the ratio of the internal memory and block sizes $\log_2(m/b)$. Additionally, only bit indices that are permuted across block boundaries require physical movement; other cases can be accomplished either by reordering entire blocks or rearranging values within blocks, both of which can be performed (in unlimited quantity) in a single pass. Thus, looking at the rightmost $\log_2(b)$ permutation indices in the bit-level permutation, and counting number of these whose index value is less than $\log_2(b)$, provides the number of address bits δ that must be permuted across block boundaries. The pass count can be bounded at $\delta/\log_2(m/b)$.

Thus, the offline cost of generating a schedule is $O(\delta \log_2(m)/\log_2(m/b))$. If factor sorting is enabled, there is also an additional nlog(n) sorting cost per pass, yielding $O(\delta \log_2(m) \log_2^2(m)/\log_2(m/b))$. Generally, for any array large enough to require use of the tiling algorithm, this offline cost will dwarfed by the cost of executing the permutation.

The online cost of executing a schedule is $\delta/\log_2(m/b)$ passes, each of which performs 2m individual internal memory accesses and 2(m/b) block accesses to external memory. Because passes copy elements (instead of exchanging them in place), 2m elements of external memory are required. One counter per dimension of the largest ispace is also required; these counters may reside in registers or in internal memory not used for storing array elements.

The above-described embodiment details schedule execution for a fully associative cache that does not pollute the cache on writes. The schedule generation and execution methods can be specialized for various other memory architectures.

One example of such an architecture is block I/O architecture. In block I/O architecture, memory transfers between the internal and external memories take the form of explicit block transfers, as opposed to the implicit transfers performed by caches. Schedules generated by the main algorithm 200 can be used in this context given: a "software paging" infrastructure that reads the appropriate block for addresses returned by the schedule enumeration, and manages the mapping of schedule addresses to memory blocks and offsets; and, an additional internal memory block of size b used for buffering the sequential writes generated by the execution loop and performing the appropriate block write when the buffer is full. A system using this architecture could also support the inverse permutation optimization explained above. Unlike the cache architecture, in which the internal memory maintains a consistent image of the external memory, the I/O model does not automatically propagate updates to the external memory. This allows for external memory to be updated in place, eliminating the double-buffering in execution algorithm 700. If exploited, this block reuse introduces an additional permutation, which can be accommodated by manipulating the fixup permutation sent to the next pass of the main loop 200.

Another memory architecture is a fully associative cache. The cache architecture used in the example described above does not evict or invalidate any cache line when a memory address is written, allowing the entire cache to be utilized by source array data. Many cache designs attempt to take advantage of temporal reuse by storing the written value in the cache (evicting an old line if necessary), which is pessimal for transposition (which exhibits no temporal reuse) and creates a "read/write" contention. For a fully-associative cache, this can be handled by using only half of the internal memory to hold input data, assuring that no read/write contention can take place. Doing so increases the pass count by as much as a factor of two, since a correspondingly smaller range of indices is permuted in a pass. It is possible to compensate for this and achieve the original (full-memory) pass count. A pass in the original (write-around) execution loop 700 reads values in permuted order and writes them serially, using the entire cache to buffer reads. Instead, values may be read in a permuted order, using only half the cache to buffer them; and values may be written in a (possibly different) permuted order, using the remaining half of the cache to buffer them. A write permutation and the corresponding fixup permutation for the next pass are computed by applying the tiling algorithm to the inverse of the fixup permutation returned by the construction of the read portion of the current pass. (The fixup permutation is always symmetric; thus, no additional computation is required to invert it.)

FIG. 8 shows sample pseudocode implementation 800 of the main loop 200, with the modifications discussed above for a fully-associative write-back cache.

Figure 9:
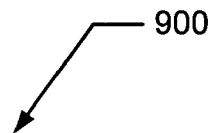
FIG. 9 is a sample pseudocode listing of the schedule execution method described in FIG. 6, with modifications for a fully-associative write-back cache.

FIG. 9 shows sample pseudocode implementation 900 of the schedule execution method 600 for a fully-associative write-back cache.

Another such memory architecture is the set-associative cache. This architecture adds another form of contention, as each block of external memory can be loaded only into a restricted set of internal memory locations, thus adding a "read/read" contention to the read/write contention described above. For associativity factors of 2 or larger, this additional contention can be avoided by accounting for the degree of associativity in the tiling algorithm 400.

Sample pseudocode of an implementation 1000 of the tiling algorithm 400 for a power-of-2 set-associative cache architecture appears in FIG. 10. The basic idea of this implementation 1000 is to model and track the availability of associativity sets so that this availability can be used to limit the tile counts of dimensions. The implementation 1000 maintains a variable availAssoc whose initial value is the cache's associativity factor k, and which decreases as associativity sets become occupied during tiling. Given a particular availAssoc value and stride, the implementation 1000 computes the maximum count value assocCount that will not overfill associativity sets and cause evictions through self-interference. This is then used to limit the dimension count passed to the existing tiling computation. Once the tile count is known, availAssoc is reduced accordingly. The implementation 1000 accounts for caches that invalidate or evict blocks on write by leaving the internal memory size m unchanged, but reducing the initial associativity k by a factor of 2. An alternate embodiment compensates for invalidation or eviction via a double-permutation strategy similar to that proposed for fully associative caches (algorithms 800 and 900). The resulting loss of buffer space for permuting reads can be compensated by performing permutation on both reads and writes, as described above.

Limited associativity may have a large effect on the efficacy of the main loop 200 because it imposes sharp limits on the tile counts of dimensions with large strides. For example, transposing a 512×512 matrix in a 128-line fully-associative write-around cache requires 2 passes, but transposing the same matrix in a 4-way associative variant of the same cache requires 4 passes.

The disclosed method can also be applied to direct-mapped (1-way associative) caches. However, instead of changing the tiling algorithm as described for other architectures, special runtime copying routines would be required such as those used in direct-mapped cache emulation of I/O algorithms.

The disclosed method may also be applicable to multi-level memory hierarchies. Most modern memory architectures are hierarchies in which several levels of increasingly faster but smaller memories cache data from the next-outermost memory. If all memory levels share the same block size and associativity, the schedule generated for the innermost memory is efficient for all memory levels. Otherwise, the factor sorting optimization (described above) may allow for an improvement in intermediate-memory efficiency. If one or more outer levels of memory have a larger block size than the inner ones, blocks in the outer level may be fetched multiple times during a pass. This can be avoided, at a cost in increased pass count, by using the larger block size when performing tiling. Whether the decreased miss rate in the intermediate memory makes up for the increased read/write traffic at various hierarchy levels (due to additional passes) depends on architectural patterns and the particular transpose being performed. Additionally, outer memory levels may have a lower associativity factor than inner ones. This is unlikely to cause major effects so long as the outer levels are sufficiently larger than the inner ones.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A method of creating a schedule for transposing an array structure of one or more dimensions in a hierarchical computer memory, the method comprising:

constructing a first representation of the array structure comprising a plurality of dimensions, wherein respective count and stride values are associated with respective dimensions of the plurality of dimensions;

permuting the representation according to a permutation;
determining that the permuted representation describes a non-canonical-order layout;
as a result of the determination, tiling the permuted representation based on one or more attributes of a target memory architecture, wherein tiling the permuted representation comprises:
  calculating for one of the plurality of dimensions of the first representation a largest count value compatible with a goal of memory efficiency;
  creating a second representation of the array structure and a third representation of the array structure;
  adding to the second representation a first new dimension comprising the largest count value and the respective stride value of the one of the plurality of dimensions;
  adding to the third representation a second new dimension comprising a new count value and a new stride value, wherein the new stride value is equivalent to a memory span of the first new dimension;
repeating the above steps until the representation describes a desired rearrangement of the array structure; and
emitting the tiled representation to the schedule for transposing an array structure of one or more dimensions in a hierarchical computer memory.

2. The method of claim 1, wherein the permutation is a first permutation, further comprising generating a second permutation based on the tiled representation.

3. The method of claim 1, further comprising inverting the permutation.

4. The method of claim 1, further comprising combining adjacent dimensions in the first representation.

5. The method of claim 1, further comprising removing degenerate dimensions from the first representation.

6. The method of claim 1, further comprising reordering the first representation according to stride values.

7. The method of claim 1, wherein the target memory architecture is a fully-associative cache.

8. The method of claim 1, wherein the target memory architecture is a set-associative cache.

9. The method of claim 8, further comprising maintaining a model of available associativity sets.

10. The method of claim 1, wherein the target memory architecture uses an explicit block I/O architecture.

11. A computer-readable medium containing instructions which, when executed, cause a computer to perform a method of creating a schedule for transposing an array structure of one or more dimensions in a computer memory, the method comprising:
  constructing a first representation of the array structure comprising a plurality of dimensions, wherein respective count and stride values are associated with respective dimensions of the plurality of dimensions;
  permuting the representation according to a permutation;
  determining that the permuted representation describes a non-canonical-order layout;
  as a result of the determination, tiling the permuted representation based on one or more attributes of a target memory architecture, wherein tiling the permuted representation comprises:
    calculating for one of the plurality of dimensions of the first representation a largest count value compatible with a goal of memory efficiency;
    creating a second representation of the array structure and a third representation of the array structure;
    adding to the second representation a first new dimension comprising the largest count value and the respective stride value of the one of the plurality of dimensions;
    adding to the third representation a second new dimension comprising a new count value and a new stride value, wherein the new stride value is equivalent to a memory span of the first new dimension;
  repeating the above steps until the representation describes a desired rearrangement of the array structure; and
  emitting the tiled representation to the schedule for transposing an array structure of one or more dimensions in a hierarchical computer memory.

12. An array structure in a computer memory transposed according to a method, the method comprising:
  constructing a first representation of the array structure comprising a plurality of dimensions, wherein respective count and stride values are associated with respective dimensions of the plurality of dimensions;
  permuting the representation according to a permutation;
  determining that the permuted representation describes a non-canonical-order layout;
  as a result of the determination, tiling the permuted representation based on one or more attributes of a target memory architecture, wherein tiling the permuted representation comprises:
    calculating for one of the plurality of dimensions of the first representation a largest count value compatible with a goal of memory efficiency;
    creating a second representation of the array structure and a third representation of the array structure;
    adding to the second representation a first new dimension comprising the largest count value and the respective stride value of the one of the plurality of dimensions;
    adding to the third representation a second new dimension comprising a new count value and a new stride value, wherein the new stride value is equivalent to a memory span of the first new dimension;
  repeating the above steps until the representation describes a desired rearrangement of the array structure;
  emitting the tiled representation to a schedule for transposing an array structure of one or more dimensions in a hierarchical computer memory; and
  executing the schedule.

13. The array structure of claim 12, wherein executing the schedule comprises:
  reading data from the array structure according to the schedule; and
  writing the data in sequential order.

14. The array structure of claim 12, wherein executing the schedule comprises:
  reading data from the array structure in sequential order; and
  writing the data according to the schedule.

15. The array structure of claim 12, wherein executing the schedule comprises:
  reading data from the array structure according to the schedule; and
  writing the data according to the schedule.

* * * * *